United States Patent [19]

Crowley

[11] 4,101,415
[45] Jul. 18, 1978

[54] SOLVENT DEASPHALTING
[75] Inventor: Ralph P. Crowley, Woods Cross, Utah
[73] Assignee: Phillips Petroleum Company, Bartlesville, Okla.
[21] Appl. No.: 777,217
[22] Filed: Mar. 14, 1977
[51] Int. Cl.² ......................... C10C 1/18; C10C 3/08
[52] U.S. Cl. ................................... 208/45; 208/23; 208/309
[58] Field of Search ........................ 208/45, 309, 23
[56] References Cited
U.S. PATENT DOCUMENTS

| 2,691,621 | 10/1954 | Gagle | 208/23 |
|---|---|---|---|
| 3,311,551 | 3/1967 | Van Pool | 208/45 |
| 3,563,778 | 2/1966 | Corbett et al. | 208/45 |
| 3,830,732 | 8/1974 | Gatsis | 208/309 |

Primary Examiner—Herbert Levine

[57] ABSTRACT

Heavy hydrocarbon materials containing asphalt are separated into three different fractions according to chemical composition, namely, a paraffin-waxy fraction, a resin fraction, and an asphaltene-solids fraction, by a process comprising two-stage solvent treatment at different solvent-to-feed ratios and different temperatures. In another embodiment, a fourth product comprising an asphalt fraction can be produced by blending a portion of the resin fraction with a portion of the raffinate obtained from the first solvent extraction fraction stage.

6 Claims, 1 Drawing Figure

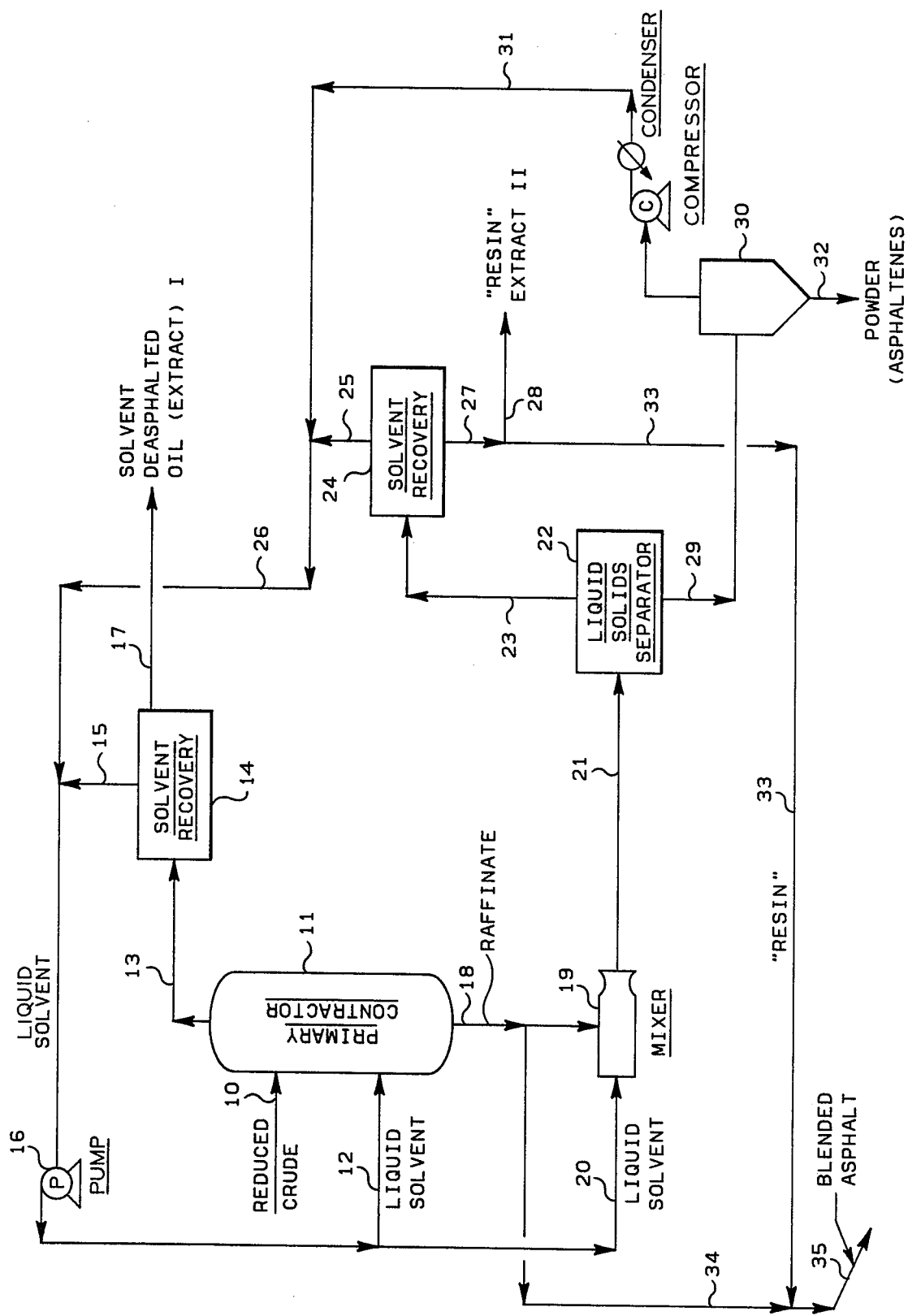

SOLVENT DEASPHALTING

This invention relates to a process for producing at least three different fractions according to chemical composition from heavy hydrocarbon materials containing asphalt. In accordance with one aspect, this invention relates to a two-stage solvent treatment of heavy hydrocarbon materials containing asphalt to produce a paraffin-waxy fraction, a resin fraction, and an asphaltene (solids) fraction. In accordance with a further aspect, this invention relates to a two-stage solvent extraction process for the separation of heavy hydrocarbon materials containing asphalt wherein a higher solvent-to-oil ratio is used in the second stage, as well as a lower temperature than the first stage, so as to separate the heavy hydrocarbon feed material into at least three different fractions according to chemical composition. In accordance with a further aspect, this invention comprises subjecting reduced crude or other hydrocarbons containing asphaltic materials to plural solvent extractions under conditions wherein asphaltic solids are formed in the presence of a large excess of solvent prior to final solvent removal and recovery of solids product.

The propane extraction or treatment of topped crude to produce an asphalt of low wax content is conventional in the petroleum industry. Crude oil is generally subjected to atmospheric distillation to recover separate streams of light gases, gasoline, kerosene, and gas oil, leaving a bottoms stream of residual material amounting to about 40 percent by volume of the original crude oil. This residual stream is then subjected to vacuum distillation to further reduce the residuum to the range of about 5 to 10 percent by volume of the original crude oil and recover additional quantities of gas oil. The vacuum-reduced crude or residuum is then propane-treated or extracted to reduce the wax content of the residuum and produce an asphalt of low wax content which is suitable as an asphalt cement for road construction and similar application.

It has been found that the treatment of some crude oils in accordance with the foregoing process results in the production of an asphalt of too high a wax concentration to permit use thereof as road building material. One such crude oil is the Rangely crude from the western Colorado area. This crude oil has been successfully treated by subjecting the crude oil before atmospheric and vacuum distillation to a centrifuging step to recover a substantial proportion of the wax content. This centrifuging step is expensive in that it requires rather expensive equipment and is time consuming.

This invention is concerned with a process for treating a heavy hydrocarbon material containing asphalt by plural-stage solvent extraction in order to produce at least three different product streams comprising a paraffin-waxy fraction, a resin-naphthenic fraction, and an asphaltene (solids) fraction. In accordance with a further aspect, additional product can be formed by blending a portion of the resin-naphthenic fraction with a portion of the raffinate removed from the first stage solvent extraction to yield an asphalt fraction.

Accordingly, it is an object of this invention to provide a process for the solvent treatment or extraction of heavy hydrocarbon materials containing asphalt.

Another object of this invention is to provide a process for the solvent treatment of a topped crude of high wax content to separate the hydrocarbon oil into at least three different fractions according to chemical composition.

A further object of this invention is to provide a process which produces a paraffin or waxy fraction, a resin or naphthenic fraction, and an asphaltene (solids) fraction.

A further object of this invention is to fractionate hydrocarbon oils containing asphaltic materials into at least three different fractions according to chemical composition and to do this is an effective and economical manner.

A further object of this invention is to provide a two-stage solvent extraction process for the solvent treatment or extraction of hydrocarbon oils containing asphaltic materials.

Other objects, aspects, and the several advantages of the invention will be apparent to those skilled in the art upon a study of this disclosure, the drawing, and the appended claims.

In accordance with the invention, a feed stream comprising reduced crude or other hydrocarbon oils containing asphaltic materials is contacted with a deasphalting solvent in a first solvent treatment zone and the asphaltic residue or raffinate removed from the first extraction zone is contacted in a second extraction contact zone with a relatively high quantity of additional solvent, and the resulting admixture is subjected to liquid-liquid phase separation and the heavy (solids-containing) raffinate phase obtained is subjected to flashing to remove residual solvent and yield a powdered asphaltic (asphaltene) product.

In one preferred embodiment, solvent separated from the extracted oils in the first extraction zone and the phase separation zone, as well as solvent recovered from the flashing step, is recycled to the first extraction zone and to the second extraction zone.

In accordance with a further embodiment, in order to produce specification asphalt, a portion of the asphaltic residue or raffinate obtained from the first extraction zone is blended with a portion of the solvent-free oil or extract recovered from the effluent from the second contact zone to produce an asphalt product fraction.

The hydrocarbon feed to the process comprises asphaltic bituminous materials containing resins, oils, and asphaltenes of substantially higher molecular weight than the resins and oils. Materials coming in this category include topped crude oil, steam, or vacuum-reduced residue from crude oil, cracking residue, oxidized air-blown asphalt; catalytically oxidized air-blown asphalt, native asphalt, asphaltites (gilsonite), reduced crude oil, coal tars and pitches, and tars and pitches obtained in the extractive distillation of peat, lignite, shales, wood, and similar organic matter.

The asphalt-containing hydrocarbon feed is subjected to solvent extraction in the first and second extraction zones with a light aliphatic hydrocarbon of 3 to 6 carbon atoms per molecule including propane, butane, isobutane, pentane, isopentane, hexane, isohexane, and similar known solvents used in deasphalting, and mixtures thereof.

As indicated above, the invention comprises subjecting a feed comprising heavy hydrocarbon materials containing asphalt to solvent extraction in two separate contact zones in series and operating the second zone at a substantially higher solvent-to-feed ratio but at a lower temperature than the first zone, thereby enabling the production of asphaltene solids substantially free of other materials. The solvent treatment step in the first zone is substantially the conventional treatment of heavy hydrocarbon materials effected in the prior art, say, in a single column.

The treatment in the second zone is effected at temperatures at least 5° F below the lowest or bottoms temperature in the first zone. To illustrate, the temperature in the lower section of the first zone when a column is used is maintained in the range of 140° to 200° F, and preferably in the range of 160°–190° F, while the temperature in the upper section of the first zone is maintained in the range of 150° to 250° F, and preferably 180°–220° F. The temperature in the second contact zone is maintained in the range of 135° to 195° F, preferably in the range of 155° to 185° F.

Sufficient pressures are maintained in the two zones to insure liquid phase operation. The pressure in the first zone is generally maintained in the range of 500 to 700 psig (3,450 to 4,830 kPa gage), and the pressure in the second zone is generally maintained in the range of 475 to 675 psig (3,275 to 4,660 kPa gage).

The volume ratio of solvent to hydrocarbon feed in the first extraction zone is in the range of 2:1 to 10:1, while the volume ratio of solvent to feed in the second zone is maintained in the range of at least 20:1 and preferably 30:1 to 50:1.

The process can be effected batchwise or continuously; however, it is preferred to operate the process continuously as in conventional deasphalting. In this type of process, a hydrocarbon feed containing asphaltic materials is passed downwardly through an ascending stream of solvent in an upright solvent extraction zone maintained at elevated temperature and pressure so as to extract a substantial portion of the paraffin or waxy materials from the hydrocarbon material, leaving a substantial concentration of resin and asphaltic or asphaltene solid materials in the raffinate fraction which is removed from the bottom of the column. The raffinate fraction from the first zone containing a high concentration of added solvent is passed to a liquid-solids separation zone wherein the solvent fraction containing soluble materials including resins and naphthenic materials or extract is passed to solvent recovery, and the heavy solids-containing fraction or raffinate is passed to a flash zone to remove solvent and yield powdered asphaltenes.

A better understanding of the invention will be had upon reference to the accompanying drawing which is a schematic flow illustrating a preferred arrangement of the apparatus for effecting the invention. A reduced crude feed containing asphaltic materials is passed by way of line 10 into the upper portion of primary contactor 11 wherein reduced crude is contacted countercurrently with a mixed liquid solvent of propane and butane introduced into the bottom portion of column 11 by way of line 12. Within column 11 the reduced crude is subjected to extraction conditions as set forth herein with respect to solvent-to-oil ratios and conditions of temperature and pressure such that the solvent removes overhead by way of line 13 a substantial portion of the paraffinic or waxy materials contained in the reduced crude as the extract phase.

The overhead solvent-rich phase containing paraffinic and waxy materials is introduced into a solvent recovery zone 14 wherein the solvent-rich phase is subjected to conditions of temperature and pressure such that solvent is removed therefrom by way of line 15 and can be recycled through pump 16 to solvent extraction zone 11 and/or mixer 19. A solvent deasphalted oil (extract I) is removed from solvent recovery zone 14 by way of line 17 for other use, as desired. The stream contains constituents which have value as clean cracking stock or as lube stock. It is desirable to remove the paraffinic and waxy materials from the reduced crude as these are harmful to the production of asphalt in that they reduce ductility and prevent the production of asphalt meeting specifications.

A solvent-lean raffinate phase is removed from the base of column 11 by way of line 18 and passed to mixer 19 wherein the bottoms raffinate phase is contacted with additional liquid solvent comprising propane and butane introduced by way of line 20. The solvent-to-feed ratio in zone 19 is considerably higher than in zone 11 but the temperature in zone 19 is lower than exists in zone 11. It has been found that the asphaltic solids are separated out in the presence of a large excess of solvent in zone 19 and the total admixture removed from zone 19 in line 21 is passed to a liquid-solids separation zone 22 for recovery therefrom of a solvent-rich phase or extract phase containing resins or naphthenic materials which are passed by way of line 23 to solvent recovery zone 24. Within solvent recovery zone 24 the solvent-rich phase is subjected to conditions of temperature and pressure such that solvent is removed by line 25 and passed through line 26 as recycle to zones 11 and 19. The resin (extract II) fraction recovered from zone 24 by line 27 is passed for further use by way of line 28. This resin extract II is useful as a road oil or asphalt additive and can also be used as clean coker charge material.

A solids-containing phase or raffinate is removed from separation zone 22 by way of line 29 and passed to flash zone 30 wherein the stream is subjected to conditions of pressure and temperature such that solvent is taken overhead and passed by way of line 31 for compression, condensation, and recycle to zones 11 and 19. A powdered asphaltene product is removed from zone 30 by way of line 32. This fraction when freed from the oil materials is a hard, brittle solid which can be used as a chemical feedstock or as an ingredient in coking operations.

As a further embodiment of the invention, a portion of resin extract II removed from solvent recovery zone 24 can be passed by way of line 33 and blended with a portion of the bottoms raffinate removed from zone 11 in line 34. A blended sream comprising asphalt is removed from the system as an additional product by way of line 35.

| TYPICAL OPERATION (Calculated) | | |
|---|---|---|
| OPERATING CONDITIONS: | | |
| Solvent Fractionation Zone (11): | | |
| Pressure | 600 psig | 4,140 kPa g. |
| Top Temperature | 200° F | 93.3° C |
| Bottom Temperature | 180° F | 82.2° C |
| Solvent/Oil Volume Ratio | 8/1 | 8/1 |
| Solvent Extraction Zone (19): | | |
| Pressure | 550 psig | 3,800 kPa g. |
| Temperature | 175° F | 79.4° C |
| Solvent/Oil Volume Ratio | 40/1 | 40/1 |
| Liquid-Solid Separation (22): | | |
| Pressure | 540 psig | 3,725 kPa g. |
| Temperature | 170° F | 76.7° C |
| Separator Zone (30): | | |
| Pressure | 5 psig | 34.5 kPa g. |
| Temperature | 50° F | 10° C |
| Solvent Recovery (14) and (24): | | |
| Pressure | 260 psig | 1,795 kPa g. |

TYPICAL OPERATION
(Calculated)

| Temperature | 190° F | 80° C |
|---|---|---|

| FLOW RATES: | | |
|---|---|---|
| Reduced Crude (10) | 5,000 B/D | 795 M³/D |
| API at 60° F | 18 | 18 |
| Liquid Solvent (12) | 40,000 B/D | 6,360 M³/D |
| Composition, Vol. %: | | |
| Propane | 50 | 50 |
| n-Butane | 50 | 50 |
| Solvent plus Extract #I (13) | 44,500 B/D | 7,075 M³/D |
| Solvent (15) | 40,000 B/D | 6,360 M³/D |
| Extract #I (17) | 4,500 B/D | 715 M³/D |
| Raffinate (18) to (19) | 200 B/D | 32 M³/D |
| Solvent (20) | 8,000 B/D | 1,272 M³/D |
| Solvent plus Extract #II (23) | 8,090 B/D | 1,286 M³/D |
| Solvent (25) | 7,930 B/D | 1,260 M³/D |
| Extract #II (28) | 130 B/D | 21 M³/D |
| Raffinate plus Solvent (29) | 110 B/D | 18 M³/D |
| Solvent (31) | 70 B/D | 11.7 M³D |
| Solids (32) | 40 B/D | 6.5 M³/D |
| Extract II to Blend (33) | 30 B/D | 5 M³/D |
| Raffinate (18) to Blend (34) | 300 B/D | 48 M³/D |
| Asphalt Blend[1] | 330 B/D | 53 M³/D |

[1] Passes Ductility Test (110 + cm at 77° F at 5 cm/min.)

I claim:

1. A process for producing a paraffinic-waxy fraction, a resin-naphthenic fraction, and a solids-asphaltene fraction from an asphalt-containing heavy hydrocarbon material which comprises the steps of:

(a) contacting a hydrocarbon charge stock containing asphaltic materials and resins with a first portion of a selective solvent comprising light paraffins and mixtures thereof at a relatively low solvent-to-hydrocarbon volumetric ratio in the range of 2:1 to 10:1 and under extraction conditions of temperature and pressure sufficient to separate a first solvent-rich extract fraction containing paraffins and waxy materials and a first solvent-lean raffinate fraction containing resins, naphthenes, and asphaltene, (b) separating paraffinic waxy materials from said first solvent-rich extract phase and recovering a paraffinic waxy phase and solvent, (c) contacting said first solvent-lean raffinate fraction with a second portion of said selective solvent at a solvent-to-hydrocarbon volumetric ratio higher than said ratio in (a) and at a temperature and pressure lower than in (a) such that asphaltic solids are formed in the presence of a large excess of solvent and that substantially all soluble materials are dissolved in a second solvent-rich extract phase, (d) passing the admixture formed in (c) to a liquid-solids phase separation zone and allowing the admixture to phase separate into a heavy solids-containing phase and a solvent-hydrocarbon phase relatively free from asphaltenes, (e) separating a resin extract fraction from said solvent-hydrocarbon phase of (d) and recovering a resin fraction and solvent, and (f) passing said heavy solids-containing phase to a flashing zone and therein subjecting same to flashing conditions of temperature and pressure sufficient to separate residual solvent therefrom and yield a powdered asphaltic product comprising asphaltenes.

2. A process according to claim 1 wherein the solvent separated in steps (b), (e), and (f) is recycled to steps (a) and (c).

3. A process according to claim 1 wherein the solvent in steps (a) and (c) is the same and is a mixture of propane and butane and the solvent-to-hydrocarbon volumetric ratio in (c) is at least 20:1.

4. A process according to claim 1 wherein at least a portion of the first solvent-lean raffinate fraction (a) and at least a portion of the resin fraction recovered in (e) are blended to form an asphalt product fraction.

5. A process according to claim 1 wherein the solvent in steps (a) and (c) is the same and is a mixture of propane and butane and the solvent-to-hydrocarbon volumetric ratio in (c) is at least 20:1, with the further proviso that the solvent separated in steps (b), and (e), and (f) is recycled to steps (a) and (c).

6. A process according to claim 5 wherein at least a portion of said first solvent-lean raffinate fraction in (a) and at least a portion of the resin fraction recovered in (e) are blended to form an asphalt product fraction.

* * * * *